(12) United States Patent
Nakaoka et al.

(10) Patent No.: US 10,058,801 B2
(45) Date of Patent: Aug. 28, 2018

(54) FILTER WITH DIVERSE SHAPED AND DIMENSIONED PROTRUSIONS FORMED ON AN END PLATE OF ITS CYLINDRICALLY SHAPED FILTER MATERIAL

(71) Applicant: YAMASHIN-FILTER CORP., Kanagawa (JP)

(72) Inventors: Hideo Nakaoka, Kanagawa (JP); Jiro Inoue, Kanagawa (JP)

(73) Assignee: YAMASHIN-FILTER CORP., Kanagawa (JP)

( * ) Notice: Subject to any disclaimer, the term of this patent is extended or adjusted under 35 U.S.C. 154(b) by 293 days.

(21) Appl. No.: 15/045,290

(22) Filed: Feb. 17, 2016

(65) Prior Publication Data

US 2016/0243470 A1    Aug. 25, 2016

(30) Foreign Application Priority Data

Feb. 25, 2015    (JP) .................................. 2015-034819

(51) Int. Cl.
*B01D 27/00*    (2006.01)
*B01D 35/00*    (2006.01)
(Continued)

(52) U.S. Cl.
CPC ............ *B01D 29/21* (2013.01); *B01D 29/111* (2013.01)

(58) Field of Classification Search
CPC ....... A47J 27/002; A47J 31/446; B01D 23/28; B01D 24/00; B01D 25/00; B01D 27/00; B01D 29/00; B01D 29/01; B01D 29/012; B01D 29/05; B01D 29/0029; B01D 29/0047; B01D 29/005; B01D 29/0009; B01D 29/035; B01D 29/071; B01D 29/072; B01D 29/11; B01D 29/111; B01D 29/114; B01D 29/13; B01D 29/15; B01D 29/21; B01D 29/31; B01D 29/44; B01D 29/50; B01D 29/56; B01D 29/58; B01D 33/00; B01D 33/35; B01D 33/37; B01D 33/41;
(Continued)

(56) References Cited

U.S. PATENT DOCUMENTS

| 4,871,455 A | 10/1989 | Terhune et al. |
| 5,045,192 A * | 9/1991 | Terhune ................. B01D 29/15 210/232 |
| 2003/0127385 A1* | 7/2003 | Spriegel ................. B01D 29/15 210/484 |

FOREIGN PATENT DOCUMENTS

| JP | S60-500803 A | 5/1985 |
| JP | S63-065918 A | 3/1988 |

(Continued)

OTHER PUBLICATIONS

Office Action issued in Japanese Patent application No. 2015-034819, dated Jul. 3, 2018, with English Translation (8 pages).

*Primary Examiner* — Hayden Brewster
(74) *Attorney, Agent, or Firm* — Nakanishi IP Associates, LLC

(57) ABSTRACT

An adhesive applied to an inner side of a bottom surface of a plate having a substantially hollow cylindrical shape with a closed bottom fixes one end of the filter material and the plate to each other. A plurality of projections located at different positions in a circumferential direction are formed on the plate, and a leading end of each of the projections comes into contact with the filter material.

5 Claims, 7 Drawing Sheets

(51) Int. Cl.
*B01D 35/28* (2006.01)
*B01D 29/21* (2006.01)
*B01D 29/11* (2006.01)
B01D 24/00 (2006.01)
B01D 25/00 (2006.01)

(58) Field of Classification Search
CPC ........ B01D 33/42; B01D 35/00; B01D 35/02; B01D 35/28; B01D 35/30; B01D 35/153; B01D 36/02; B01D 2201/0446; B01D 2201/0453; B01D 2201/24; B01D 2201/29; B01D 2201/30; B01D 2201/34; B01D 2201/302; B01D 2201/40; B01D 2201/4084; B21D 39/00; B21D 39/02; B21D 39/021; B21D 39/03; B21D 39/031; B21K 25/00; B23P 11/00; D21D 5/16
See application file for complete search history.

(56) References Cited

FOREIGN PATENT DOCUMENTS

| | | | |
|---|---|---|---|
| JP | H02-008506 U | 1/1990 | |
| JP | H06-007765 Y | 3/1994 | |
| JP | 3185612 U | 8/2013 | |
| WO | 1984-004050 A1 | 10/1984 | |

\* cited by examiner

FILTER WITH DIVERSE SHAPED AND DIMENSIONED PROTRUSIONS FORMED ON AN END PLATE OF ITS CYLINDRICALLY SHAPED FILTER MATERIAL

BACKGROUND

Technical Field

The present invention relates to a filter element.

Related Art

In Japanese Utility Model Registration No. 3185612, a filter configuration is described in which both end surfaces of a filter come into contact with ribs formed on a first annular base and a second annular base.

Japanese Utility Model Registration No. 3185612 discloses a configuration in which the first annular base and the second annular base are screwed to the ends of a filter cartridge, removing the need for the first annular base or the second annular base to be adhered to the filter cartridge. However, due to the nature of a filter product, the first annular base or the second annular base (hereinafter referred to as "plate") is typically adhered to the filter cartridge (hereinafter referred to as "filter material").

In a configuration in which filter material and ribs come into contact with each other, such as that described in Japanese Utility Model Registration No. 3185612, adhesive does not flow well between the filter material and the plate, resulting in problems such as poor adhesion between the filter material and the plate due to regions having no adhesive being formed therebetween.

SUMMARY

One or more embodiments of the present invention provide a filter element capable of eliminating adhesive-free regions between a filter material and a plate, and preventing poor adhesion between the filter material and the plate.

A filter element according to one or more embodiments of the present invention includes, for example, a filter material having a substantially hollow cylindrical shape that is open at both ends; and a plate having a substantially hollow cylindrical shape with a closed bottom including a plurality of projections formed on an inner side of a bottom surface, the projections being located at different positions in a circumferential direction; wherein the plate is provided covering one end of the filter material; a leading end of each of the projections comes into contact with the filter material; and the filter material and the plate are fixed via an adhesive, the adhesive being applied to the inner side of the bottom surface of the plate.

According to the filter element of one or more embodiments of the present invention, the adhesive applied to the inner side of the bottom surface of the plate that has a substantially hollow cylindrical shape with a closed bottom fixes one end of the filter material and the plate to each other. The plurality of projections located at different positions in the circumferential direction are formed on the plate, and the leading end of each of the projections comes into contact with the filter material. As a result of this configuration, the area between the projections serves as a flow path for the adhesive, and the adhesive fills the area between the filter material and the plate equally, thereby eliminating adhesive-free regions formed between the filter material and the plate. As a result, poor adhesion between the filter material and the plate can be prevented.

A filter element according to one or more embodiments of the present invention includes, for example, a filter material having a substantially hollow cylindrical shape that is open at both ends; and a plate having a substantially hollow cylindrical shape with a closed bottom including a projection which is an annular rib formed on an inner side of a bottom surface; wherein the bottom surface has a surface area on an inner peripheral side defined by the projection greater than or equal to a surface area on an outer peripheral side defined by the projection; the plate is provided covering one end of the filter material; a leading end of the projection comes into contact with the filter material; and the filter material and the plate are fixed via an adhesive, the adhesive being applied to the inner side of the bottom surface of the plate.

According to the filter element of one or more embodiments of the present invention, the adhesive applied to the inner side of the bottom surface of the plate having a substantially hollow cylindrical shape with a closed bottom fixes one end of the filter material and the plate to each other. The annular projection is formed on the plate, and the bottom surface has the surface area on the inner side (inner peripheral side) defined by the projection greater than or equal to the surface area on the outer side (outer peripheral side) defined by the projection. As a result, even if the amount of adhesive on the inner peripheral side increases and a greater amount of adhesive is absorbed on the inner peripheral side, an adhesive-free region is not formed between the filter material and the plate. As a result, poor adhesion between the filter material and the plate can be prevented.

Here, a ridged and grooved portion having a height less than a height of the projection may be formed on the inner side of the bottom surface of the plate. The ridged and grooved portion increases the adhesiveness of the adhesive. As a result, the adhesive can securely fix the filter material and the plate to each other.

Here, the plurality of projections may correspond to an annular rib including cutouts at a plurality of positions, and a diameter of the rib may be substantially the same value as the average value of an inner diameter and an outer diameter of the plate. That is, the rib is located substantially in the center of the plate, and the cutout sections serve as flow paths for the adhesive. As a result, it is possible to stabilize and support the filter material, and prevent poor adhesion between the filter material and the plate.

According to one or more embodiments of the present invention, it is possible to eliminate adhesive-free regions between the filter material and the plate, and prevent poor adhesion between the filter material and the plate.

DETAILED DESCRIPTION

Below, detailed descriptions will be given of embodiments of the present invention with reference to the drawings.

First Embodiment

Figure 1:
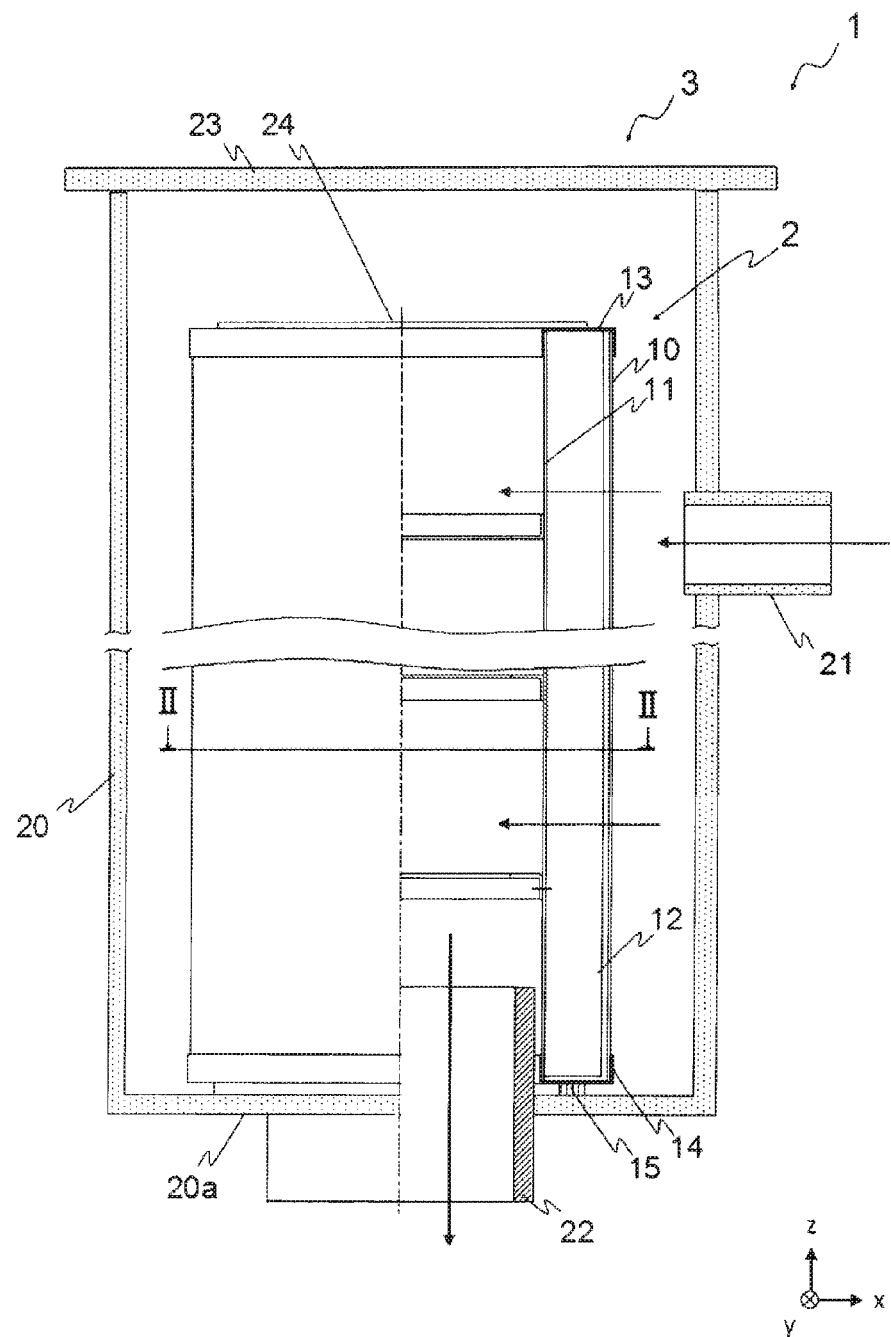
FIG. 1 is a schematic view of a filter device 1 according to a first embodiment of the present invention.

FIG. 1 is a diagram illustrating a schematic view of a filter device 1. The filter device 1 removes particulates and the like included in a fluid such as an oil or water using a filter, and mainly includes a filter element 2 and a filter case 3. FIG. 1 illustrates a cross section of a right half of the filter element 2 and the filter case 3.

The filter element 2 mainly includes an outer cylinder 10, an inner cylinder 11, a filter material 12 provided between the outer cylinder 10 and the inner cylinder 11, plates 13, 14 provided at both ends of the outer cylinder 10, the inner cylinder 11, and the filter material 12, and a gasket 15.

The outer cylinder 10 and the inner cylinder 11 are members that have a substantially hollow cylindrical shape that is open at both ends. The outer cylinder 10 and the inner cylinder 11 are formed using a material having high corrosion resistance (such as a stainless steel). It should be noted that the outer cylinder 10 and the inner cylinder 11 may be formed using a resin. The inner cylinder 11 is housed on the inner side of the outer cylinder 10. The diameter of the inner cylinder 11 is less than that of the outer cylinder 10, and the height of the inner cylinder 11 is substantially the same as the height of the outer cylinder 10. The filter material 12 has a substantially hollow cylindrical shape having thickness in a radial direction.

Figure 2:
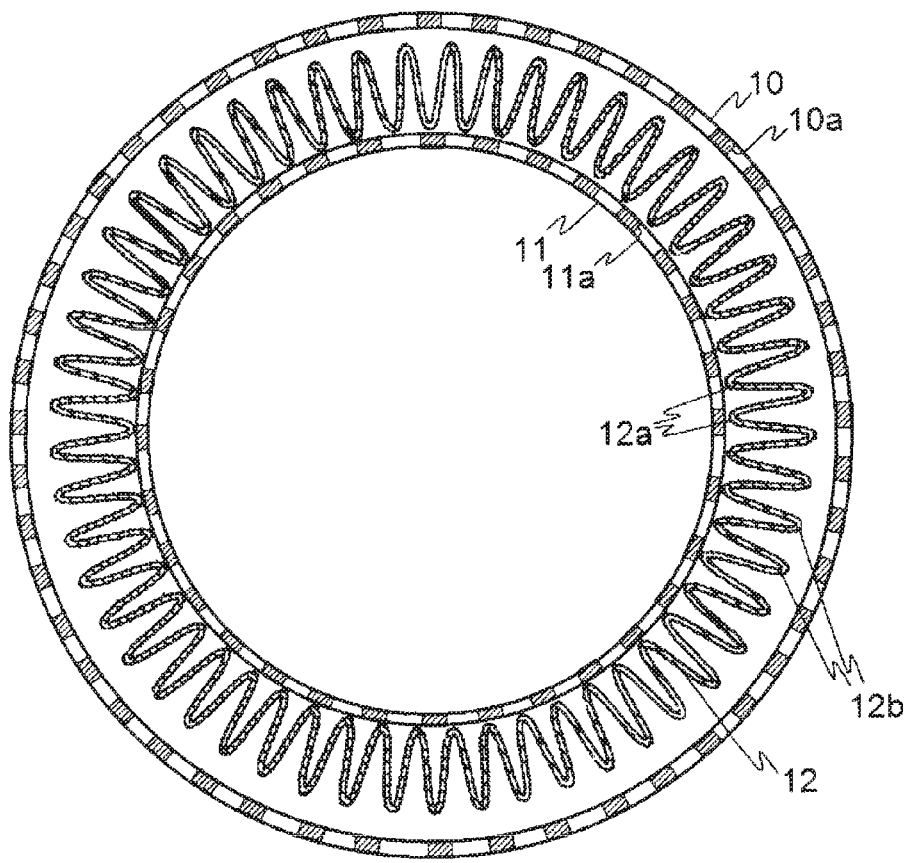
FIG. 2 is a cross-sectional view taken along II-II of FIG. 1.
Figure 2:
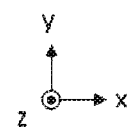

Below, detailed descriptions will be given of the outer cylinder 10, the inner cylinder 11, and the filter material 12. FIG. 2 is a cross-sectional view taken along II-II of FIG. 1.

A plurality of holes are formed on substantially an entire region of each of the outer cylinder 10 and the inner cylinder 11. A plurality of holes 10a are formed on substantially the entire region of the outer cylinder 10, and a plurality of holes 11a are formed on substantially the entire region of the inner cylinder 11. An outer side and an inner side of the outer cylinder 10 communicate via the holes 10a, and an outer side and an inner side of the inner cylinder 11 communicate via the holes 11a.

The filter material 12 is formed by pleating sheet-like filter paper that uses a synthetic resin, paper, or the like, connecting both ends of the pleated filter paper, and forming the filter paper into a cylindrical shape. As a result, the filter material 12 is formed into a substantially cylindrical pleated shape. The height of the filter material 12 is substantially the same as the height of the outer cylinder 10 and the inner cylinder 11.

Because the filter paper is pleated, fold peaks 12a, 12b are formed in the filter material 12. Also, because the filter material 12 is formed by forming the pleated filter paper into a cylinder, spacings between the fold peaks 12a on the inner peripheral side of the filter material 12 are narrower than spacings between the fold peaks 12b on the outer peripheral side. That is, the filter material 12 has a greater density on the inner peripheral side than on the outer peripheral side.

The fluid that has passed through the holes 10a formed in the outer cylinder 10 passes through the filter material 12 from the outer side to the inner side. At that time, impurities in the fluid are removed by the filter material 12. The fluid that has passed to the inner side of the filter material 12 passes through the holes 11a formed in the inner cylinder 11 and flows to the interior of the inner cylinder 11.

It should be noted that while the outer cylinder 10 is provided on the outer side of the filter material 12 in FIGS. 1 and 2, the outer cylinder 10 is not an essential component.

The description will now return to FIG. 1. The plate 13 is provided at one end and the plate 14 is provided at the other end of the outer cylinder 10 and the inner cylinder 11. The plate 13 and the plate 14 are members that have a substantially cylindrical shape with a closed bottom and are formed using a resin. It should be noted that the plate 13 and the plate 14 may be formed using a material having a high corrosion resistance (a stainless steel, for example).

The plate 13 and the plate 14 are provided covering the ends (openings) of the outer cylinder 10 and the inner cylinder 11, the filter material 12 being provided therebetween. In other words, the outer cylinder 10, the inner cylinder 11, and the filter material 12 are provided on the inner side of the plate 13 and the plate 14.

The gasket 15 is provided on the plate 14, and a gasket (not illustrated) is provided on the plate 13. The gasket 15 is a member having a substantially hollow disk shape, and is formed using a soft material (a rubber, for example). The gasket 15 is a sealing member that prevents the fluid from leaking outside. The gasket 15 is formed using a material having elasticity, such as a synthetic rubber such as nitrile rubber (NBR) or fluorocarbon rubber (FKM), or a resin. It should be noted that it is possible to not use the gasket (not illustrated) and the gasket 15 when the plate 13 and the plate 14 are formed using a resin.

Figure 3:
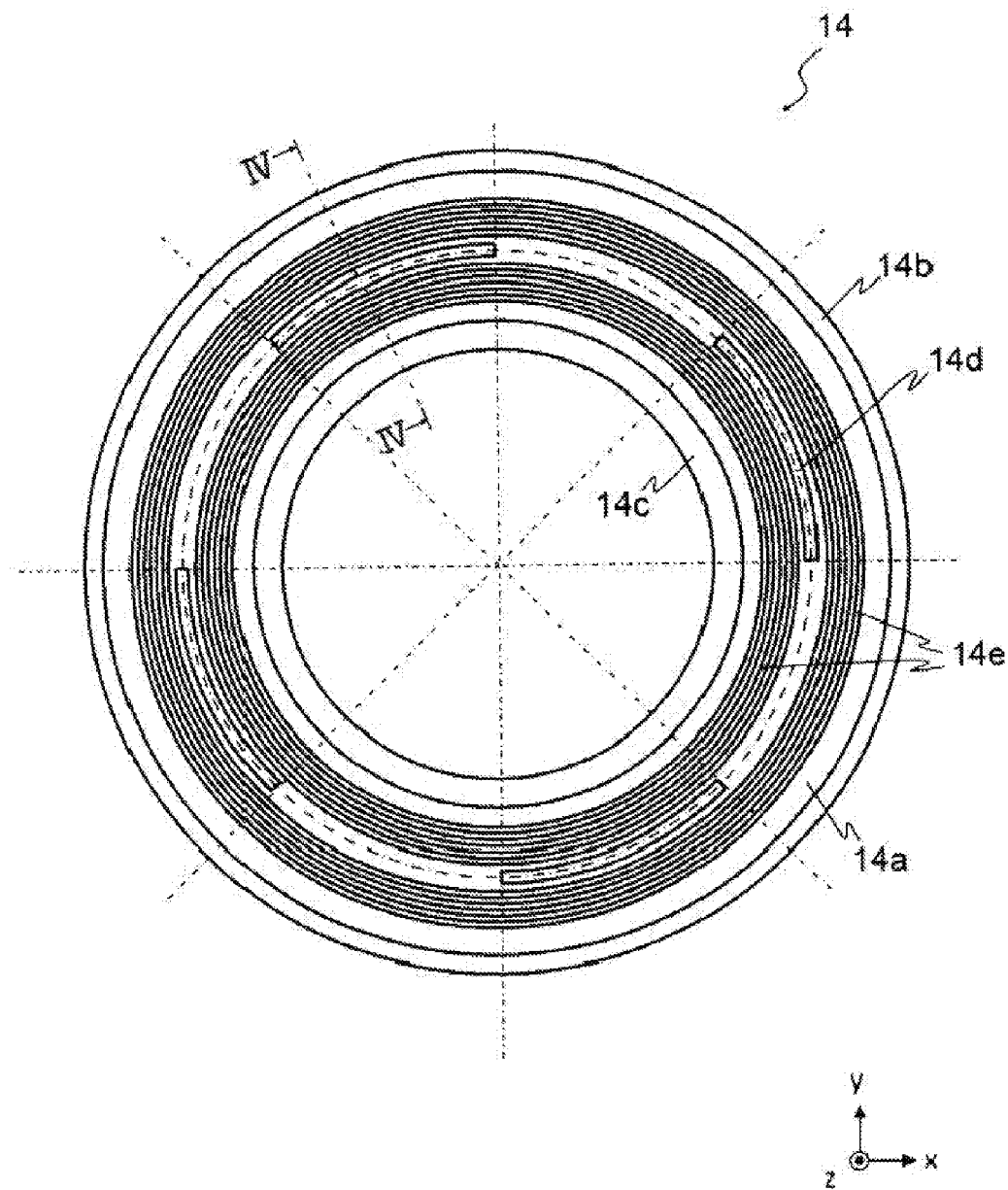
FIG. 3 is a plan view of a plate.
Figure 4:
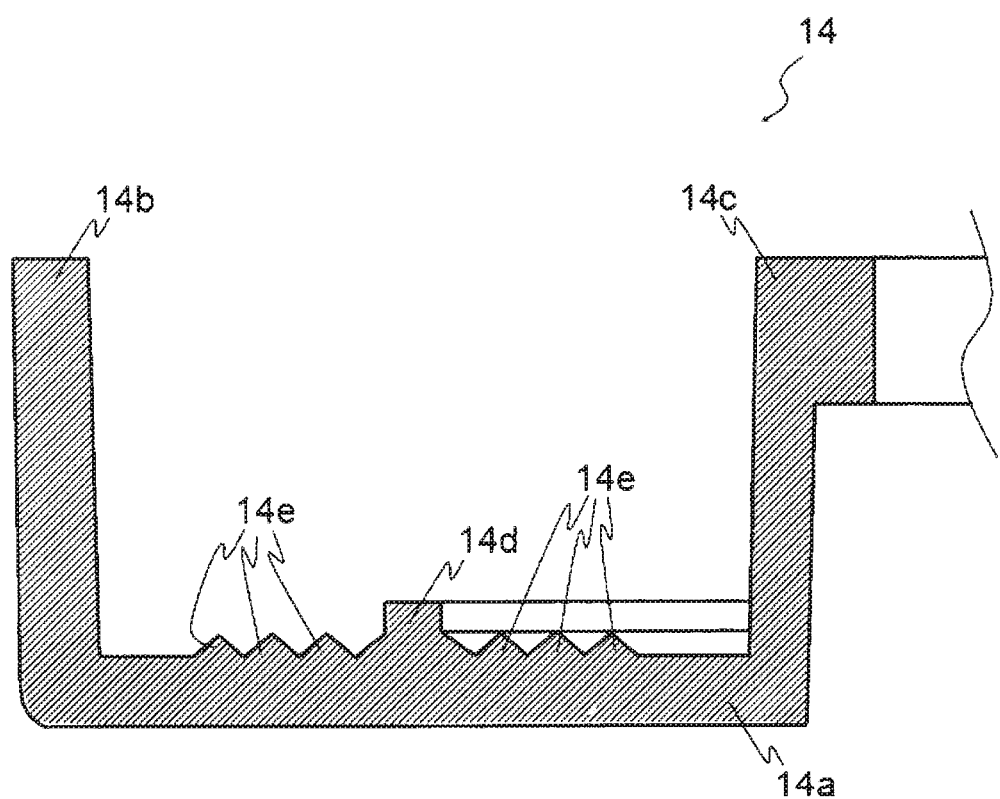
FIG. 4 is a cross-sectional view taken along IV-IV of FIG. 3, partially illustrating the plate in cross section.

FIGS. 3 and 4 are diagrams illustrating the details of the plate 14. FIG. 3 is a plan view of the plate 14, and FIG. 4 is a cross-sectional view taken along IV-IV of FIG. 3, partially illustrating the plate 14 in cross section. The shape of the plate 13 is substantially the same as the shape of the plate 14, and thus a description thereof will be omitted.

The plate 14 has a substantially hollow cylindrical shape with a closed bottom and is formed of a resin or a metal. The plate 14 mainly includes an annular bottom surface 14a, an outer wall 14b formed so as to protrude from an outer peripheral portion of the bottom surface 14a, and an inner wall 14c formed so as to protrude from an inner peripheral portion of the bottom surface 14a.

A projection 14d and a plurality of grooves 14e are formed on an inner side of the bottom surface 14a.

The projection 14d is an annular rib including cutouts at a plurality of positions. In the present embodiment, there are cutouts at four positions, and thus four projections 14d are formed. Thus, the projection 14d is a plurality of projections located at different positions in a circumferential direction. The projections 14d are formed so as to protrude from the inner side of the bottom surface 14a, that is the upper side (positive z side) of the bottom surface 14a.

The diameter of the plurality of projections 14d is substantially the same value as the average value of the inner diameter and the outer diameter of the plate 14 (the average value of the diameter of the outer wall 14b and the diameter of the inner wall 14c). That is, the projections 14d are provided substantially in the center of the bottom surface 14a. As a result, it is possible to stabilize and support the filter material during assembly. However, the positions of the projections 14d in the radial direction are not limited thereto.

The grooves 14e, similar to the projections 14d, are formed on the inner side of the bottom surface 14a. The grooves 14e each have an annular shape in the plan view (when viewed from the positive Z direction), and a cross-sectional shape that is substantially triangular with a narrow tip. The grooves 14e are formed adjacent to the projections 14d. The height of the grooves 14e is less than the height of the projection 14d.

In the present embodiment, the grooves 14e are annular, but the shape of the grooves 14e are not limited thereto. However, to increase the adhesiveness between the plate 14 and the adhesive (described in detail later), the grooves 14e are preferably formed on substantially the entire surface of the bottom surface 14a. Then, because the bottom surface 14a is a disk shape, the grooves 14e preferably have annular shapes so as to be formed on substantially the entire surface of the bottom surface 14a.

Furthermore, the position and quantity of the grooves 14e are not limited to the positions and quantity illustrated in FIG. 3. For example, a groove having a height less than the height of the projections 14d may be formed between the projections 14d. Also, the groove having a height less than the height of the projections 14d may be substantially parallel to the grooves 14e.

Figure 5:
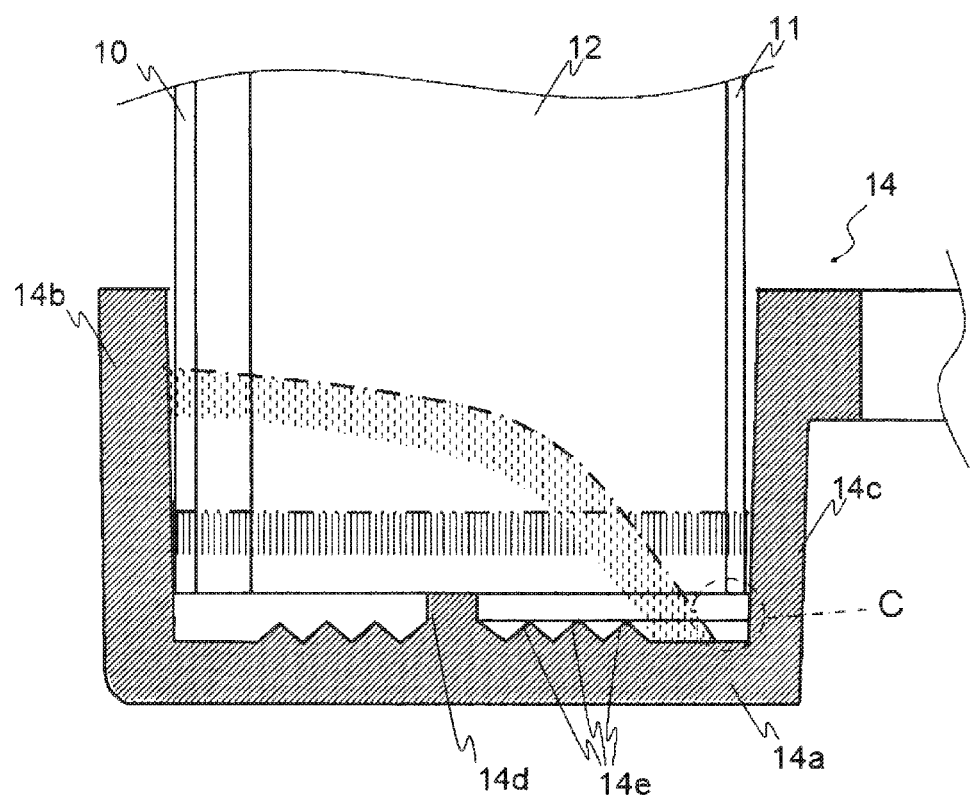
FIG. 5 is a diagram for explaining states of an adhesive.

When the plate 14 is provided to the outer cylinder 10, the inner cylinder 11, and the filter material 12, the filter material 12 comes into contact with the projections 14d (refer to FIG. 5). The grooves 14e have a height less than the height of the projections 14d, and therefore the grooves 14e and the filter material 12 do not come into contact with each other.

It should be noted that, in the present embodiment, the inner diameter of the plate 14 is about 55 mm, and the outer diameter of the plate 14 is about 90 mm. The height and width of the projections 14d are about 1.5 mm, and the height and width of the grooves 14e are about 0.5 mm and about 1.5 mm, respectively. These dimensions, however, are exemplary, and are not to be considered as limiting the present invention thereto.

The description will now return to FIG. 1. The outer cylinder 10, the inner cylinder 11, the filter material 12, the plate 13, the plate 14, and the gasket 15 are integrated as the filter element 2. The filter element 2 is provided to the interior of the filter case 3.

The filter case 3 includes a case 20, a case inflow portion 21, a case outflow portion 22, a lid 23, and a valve 24.

The case inflow portion 21 is provided on a side surface of the case 20. Further, the case outflow portion 22 having a surface parallel to the outer cylinder 10 or the inner cylinder 11 is provided on a surface parallel to the plate 14 of the case 20 (here, a bottom portion 20a). Furthermore, the lid 23 is provided on an upper portion of the case 20 mediated by packing (not illustrated) so as to cover an opening portion.

The valve 24 (not illustrated in detail) is provided to one end of the outer cylinder 10. A spring (not illustrated) is provided between the lid 23 and the valve 24. The valve 24, that is, the filter element 2 is urged in a downward direction (a direction from the lid 23 to the bottom portion 20a) in FIG. 1 by the spring. As a result, the posture of the filter element 2 inside the filter case 3 is maintained. It should be noted that the filter element 2 may be attached to the filter case 3 by screwing or the like.

The arrows in FIG. 1 illustrate the flow of the fluid. The fluid to be filtered flows from the case inflow portion 21 to the interior of the case 20. The fluid that has flowed to the interior of the case 20 flows to the interior of the inner cylinder 11 via the holes 10a formed in the outer cylinder 10, the filter material 12, and the holes 11a formed in the inner cylinder 11. The fluid that has flowed to the interior of the inner cylinder 11 flows out from the case outflow portion 22.

The case 20 and the case outflow portion 22 as well as the filter element 2 are sealed by the gasket 15 and the like. It should be noted that the flow of the fluid is not limited thereto. For example, the fluid may flow in from below (from the case outflow portion 22, for example) and flow out from above or from a side (from the case inflow portion 21, for example).

Next, a manufacturing method of the filter element 2 will be described.

First, the filter material 12 is inserted between the outer cylinder 10 and the inner cylinder 11. An adhesive (refer to FIG. 5) is applied to the inner side of the bottom surface of the plate 13 and the inner side of the bottom surface 14a (the upper side of the bottom surface 14a in FIG. 4) of the plate 14, and the plates 13, 14 are made to cover both ends of the outer cylinder 10, the inner cylinder and the filter material 12. In the present embodiment, the adhesive used is an epoxy resin-based adhesive, but the adhesive is not limited thereto.

The adhesive is a liquid when applied and subsequently cures and turns into a solid. During the assembly of the filter element 2, however, the adhesive is a liquid.

As illustrated in FIG. 3, the projections 14d are located at different positions in the circumferential direction, and gaps are formed between the projections 14d. As a result, even if the filter material 12 comes into contact with the projections 14d, the liquid adhesive can pass between the projections 14d and move from the outer cylinder 10 side to the inner cylinder 11 side, or from the inner cylinder 11 side to the outer cylinder 10 side.

FIG. 5 is a diagram for explaining states of the adhesive. In FIG. 5, the cross-sectional view of the outer cylinder 10, the inner cylinder 11, and the filter material 12 are omitted. Furthermore, a partial cross-sectional view of the adhesive is also omitted.

The adhesive is a liquid, and therefore is absorbed by the filter material 12. In particular, the filter material 12 has a higher density on the inner peripheral side than on the outer peripheral side (refer to FIG. 2), and therefore more adhesive is absorbed by the inner peripheral side of the filter material 12.

The alternate long and short dash line and dotted vertical line hatching (partially omitted) in FIG. 5 is an example indicating the state of the adhesive when the projection 14d is not divided and an annular projection without cutouts is formed. When the projection 14d is provided substantially in the center of the bottom surface 14a to stabilize and support the filter material during assembly, the amount of adhesive on the inner peripheral side defined by the projection 14d is less than the amount of adhesive on the outer peripheral defined by the projection 14d. When the projection 14d is annular without cutouts, the flow path of the adhesive is not allocated, and thus the adhesive does not flow from the outer peripheral side to the inner peripheral side. As a result, all of the adhesive on the inner peripheral side is absorbed by the filter material 12, resulting in cases of an adhesive-free section (a region C surrounded by an alternate long and short dash line in FIG. 5) being formed between the filter material 12 and the plate 14. In such a case, a portion of the filter material 12 is not adhered to the plate 14, causing the filter material 12 to more readily peel from the plate 14 and the fluid to leak from the section that is not adhered.

Conversely, when a plurality of projections 14d located at different positions in the circumferential direction are formed, the flow path of the adhesive is allocated. As a result, even if the adhesive on the inner peripheral side is absorbed by the filter material 12, the adhesive flows from the outer peripheral side to the inner peripheral side, and therefore evenly fills the region between the filter material 12 and the plate 14 as illustrated by the alternate long and two short dashes line and the vertical line hatching (partially omitted) in FIG. 5, adhering the entire surface of the filter material 12 to the plate 14. It should be noted that, because the height of the grooves 14e is less than that of the projections 14d, the flow of the adhesive is not stopped by the grooves 14e.

According to the present embodiment, the plurality of projections 14d are formed at different positions in the circumferential direction, thereby making it possible to allocated the flow path of the adhesive, and, if a certain section is adhesive-free (the inner peripheral side, for example), replenish the adhesive with the adhesive from another section (the outer peripheral side, for example). This makes it possible to eliminate adhesive-free sections, and prevent poor adhesion between the filter material and the plate. As a result, it is possible to prevent the filter material 12 from coming off the plates 13, 14, and the fluid from leaking from between the filter material 12 and the plates 13, 14.

Further, in the present embodiment, the grooves 14e are formed on the inner side of the bottom surface 14a, making it possible to increase the adhesiveness of the adhesive. As a result the adhesive can securely fix the filter material 12 and the plate 14 to each other.

Second Embodiment

Figure 6:
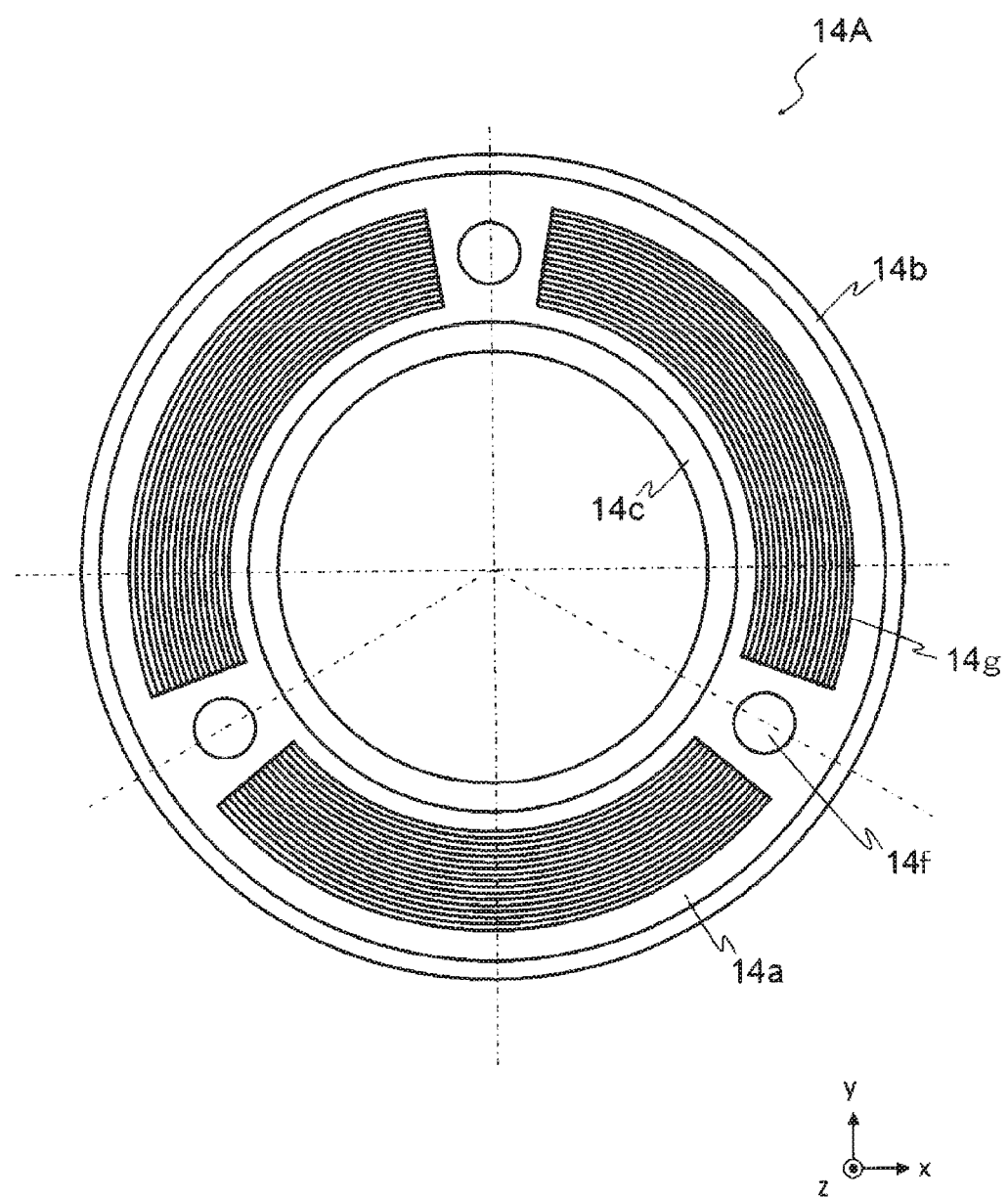
FIG. 6 is a diagram illustrating the plate according to a second embodiment of the present invention.

In the first embodiment, the projections 14d are formed by forming cutouts in an annular rib, but the mode in which the plurality of projections located at different positions in the circumferential direction are provided is not limited thereto. FIG. 6 is a diagram illustrating a plate 14A of a filter element related to a second embodiment. The difference between the filter element related to the second embodiment and the filter element related to the first embodiment is only the plate 14A (the same holds for the plate 13A), and therefore only the plate 14A will be described below; all other descriptions will be omitted. Further, the differences between the plate 14A and the plate 14 are only projections 14f and grooves 14g, and therefore only the projections 14f and the grooves 14g will be described below; all other descriptions will be omitted.

The projection 14f has a substantially cylindrical shape, and is formed at three positions on the inner side of the bottom surface 14a. The height of the projections 14f is greater than the height of the grooves 14g. The grooves 14g differ from the grooves 14e only in that the annular shape of the grooves 14e is partially cut out (cut away). Otherwise, the shape and the like are the same as those of the grooves 14e. It should be noted that the quantity of the projections 14f is not limited to three, allowing formation of four or more, for example.

Furthermore, while the grooves 14g are not formed near the projections 14f but rather in other sections in the present embodiment, the position, quantity, shape, and the like of the grooves 14g are not limited thereto. For example, the grooves 14g may extend longer than illustrated in FIG. 6, and may be formed up to a location near the projections 14f. However, even when the position, quantity, shape, and the like of the grooves 14g are modified, the grooves 14g are preferably formed on substantially the entire surface of the bottom surface 14a.

Third Embodiment

Figure 7:
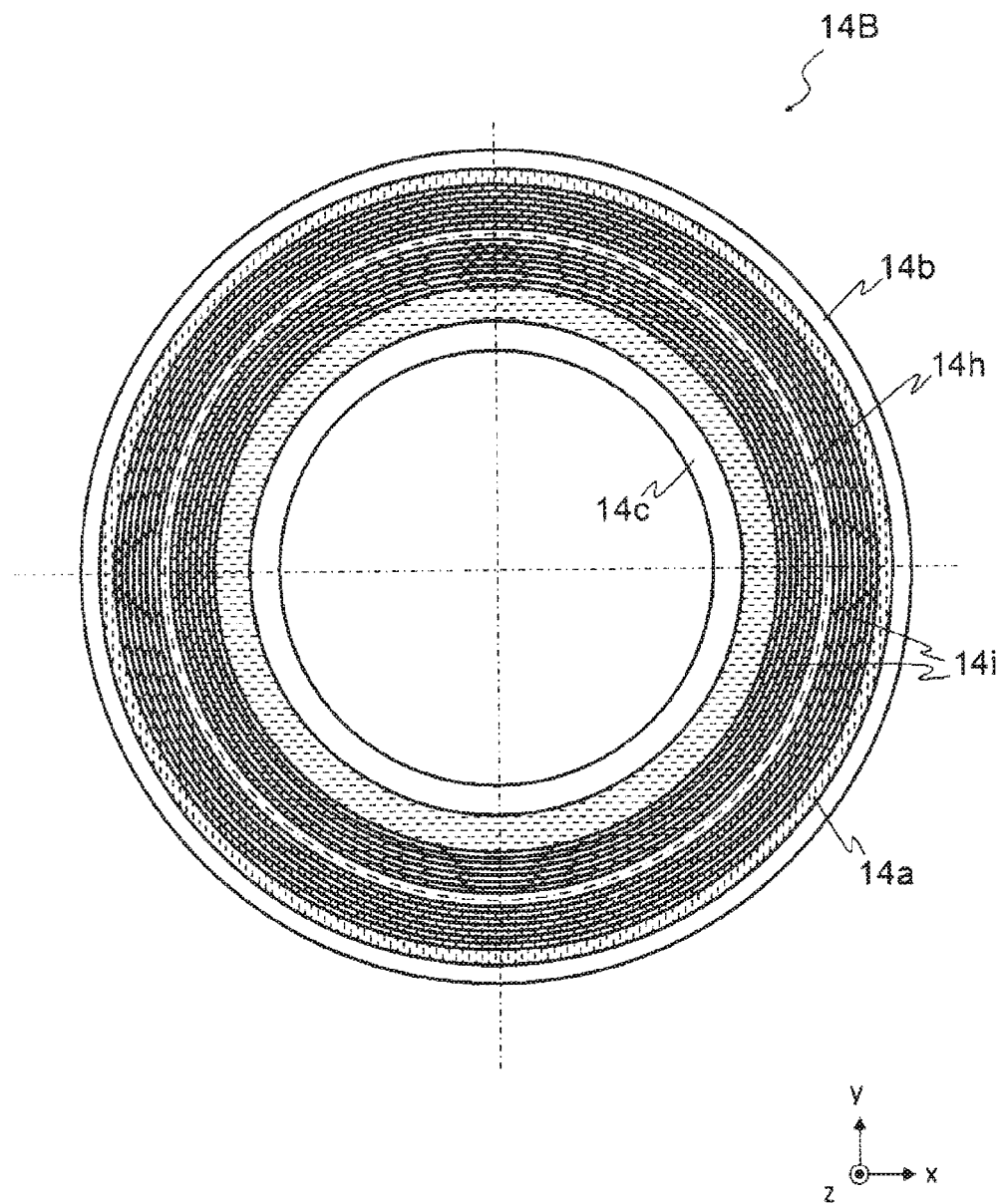
FIG. 7 is a diagram illustrating the plate according to a third embodiment of the present invention.

While in the first embodiment the adhesive-free sections are eliminated by forming the projections 14d and allocating the flow path of the adhesive by forming cutouts in the annular rib, the method of eliminating the adhesive-free sections is not limited thereto. FIG. 7 is a diagram illustrating a plate 14B of a filter element related to a third embodiment. The difference between the filter element related to the third embodiment and the filter element related to the first embodiment is only the plate 14B (the same holds for the plate 13B), and therefore only the plate 14B will be described below; all other descriptions will be omitted. Further, the differences between the plate 14B and the plate 14 are only a projection 14h and grooves 14i, and therefore only the projection 14h and the grooves 14i will be described below; all other descriptions will be omitted.

The projection 14h is an annular rib and is formed on the inner side of the bottom surface 14a. The projection 14h is formed at a position such that the surface area of the inner side of the bottom surface 14a on the inner peripheral side defined by the projection 14h (refer to the dotted horizontal line hatching area in FIG. 7) is greater than or equal to the surface area on the outer peripheral side (refer to the dotted vertical line hatching area in FIG. 7) defined by the projection 14h. FIG. 7 illustrates an example of a case in which the surface area of the bottom surface 14a on the inner peripheral side defined by the projection 14h and the surface area of the bottom surface 14a on the outer peripheral side defined by the projection 14h are substantially the same. A width, a height, and the like of the projection 14h are the same as those of the projection 14d.

The grooves 14i, similar to the grooves 14e, are annular members, and are formed on the inner side of the bottom surface 14a. The grooves 14i differ from the grooves 14e only in position in the radial direction. Otherwise, the shape and the like are the same as those of the grooves 14e.

For example, as illustrated in FIG. 5, when the projections 14d are provided substantially in the center of the bottom surface 14a, that is, when the surface area of the inner side of the bottom surface 14a on the inner peripheral side defined by the projection 14h is not greater than or equal to the surface area on the outer peripheral side defined by the projection 14h, the amount of adhesive on the inner peripheral side defined by the projections 14d is less than the amount of the adhesive on the outer peripheral side defined by the projections 14d. Accordingly, when the projection includes no cutouts and all of the adhesive on the inner peripheral side is absorbed by the filter material 12, an adhesive-free section (the region C surrounded by the alternate long and short dash line in FIG. 5) between the filter material 12 and the plate 14 may be formed.

Conversely, as illustrated in FIG. 7, when the projection 14h is formed so that the surface area on the inner peripheral side is greater than or equal to the surface area on the outer peripheral side, even if the amount of adhesive on the inner peripheral side increases and more adhesive is absorbed on the inner peripheral side, all of the adhesive located on the inner peripheral side is not absorbed by the filter material 12. This makes it possible to eliminate adhesive-free regions between the filter material and the plate, thereby preventing poor adhesion between the filter material and the plate.

Embodiments of the invention have been described in detail with reference to the drawings; however, specific configurations are not limited to the embodiments, and changes in the design or the like are also included in a range which does not depart from the gist of the invention. Accordingly, various modifications, additions, and alternatives to each element of the embodiments may occur to one skilled in the art.

Further, the terms "substantially" and "about" in the present invention are not to be understood as merely meaning strictly the same, and are concepts that include errors and deformations to an extent that does not result in loss in identity. For example, "substantially parallel" is not limited to meaning strictly parallel, and is a concept that includes an error of several degrees, for example. Further, simple expressions such as "parallel" and "orthogonal" are not to be understood as merely meaning strictly parallel, orthogonal, and the like, and include meaning substantially parallel, substantially orthogonal, and the like. Furthermore, the meaning of the term "near" in the present invention includes a region of a range (which can be determined as desired) near a position serving as a reference. For example, "near A" refers to a region of a range near A, and is a concept indicating that A may or may not be included.

The invention claimed is:

1. A filter element, comprising:
a filter material having a substantially hollow cylindrical shape that is open at both ends; and
a plate having a substantially hollow cylindrical shape with a closed bottom including a plurality of projections formed on an inner side of a bottom surface,— wherein
each of the projections has an arc shape and is disposed mutually at intervals along a circle line;
the plate covers one end of the filter material;
a leading end of each of the projections comes into contact with the filter material; and
the filter material and the plate are fixed via an adhesive, the adhesive being applied to the inner side of the bottom surface of the plate,
wherein a ridged and grooved portion having a height less than a height of each of the projections is formed on the inner side of the bottom surface of the plate.

2. A filter element, comprising:
a filter material having a substantially hollow cylindrical shape that is open at both ends; and
a plate having a substantially hollow cylindrical shape with a closed bottom including a projection which is an annular rib formed on an inner side of a bottom surface; wherein
the projection has an arc shape;
the inner side of the bottom surface of the plate has a first surface area on an inner peripheral side defined by an annular line formed by the projection greater than or equal to a second surface area on an outer peripheral side defined by the annular line formed by the projection; and
the plate covers one end of the filter material;
a leading end of the projection comes into contact with the filter material; and
the filter material and the plate are fixed via an adhesive, the adhesive being applied to the inner side of the bottom surface of the plate,
wherein a ridged and grooved portion having a height less than a height of the projection is formed on the inner side of the bottom surface of the plate.

3. The filter element according to claim 1, wherein the plurality of projections corresponds to an annular rib including a plurality of cutouts, and a diameter of the rib is substantially the same value as an average value between an inner diameter of the plate and an outer diameter of the plate.

4. The filter element according to claim 1, wherein a central axis of the substantially hollow cylindrical shape passes through a center of the circle line.

5. The filter element according to claim 2, wherein the projection having the arc shape is disposed along a circle line and a central axis of the substantially hollow cylindrical shape passes through a center of the circle line.

* * * * *